United States Patent [19]

Yamakawa

[11] Patent Number: 4,682,231

[45] Date of Patent: Jul. 21, 1987

[54] BRIGHTNESS AND CONTRAST ADJUSTING APPARATUS

[75] Inventor: Yoshifumi Yamakawa, Shinagawa, Japan

[73] Assignee: Sony Corporation, Tokyo, Japan

[21] Appl. No.: 832,720

[22] PCT Filed: Jun. 21, 1985

[86] PCT No.: PCT/JP85/00352
§ 371 Date: Feb. 10, 1986
§ 102(e) Date: Feb. 10, 1986

[87] PCT Pub. No.: WO86/00483
PCT Pub. Date: Jan. 16, 1986

[30] Foreign Application Priority Data

Jun. 21, 1984 [JP] Japan .................. 59-128114

[51] Int. Cl.$^4$ .............................................. H04N 5/58
[52] U.S. Cl. .................................... 358/168; 358/169
[58] Field of Search ............... 358/168, 169, 74, 243, 358/174

[56] References Cited

U.S. PATENT DOCUMENTS

| 3,760,099 | 9/1973 | Kong | 358/139 |
| 3,873,767 | 3/1975 | Okada | 358/169 |
| 4,204,229 | 5/1980 | Heuze | 358/169 |
| 4,587,554 | 5/1986 | Tamura | 358/168 |

FOREIGN PATENT DOCUMENTS

| 49-46332 | 5/1974 | Japan . |
| 58-71775 | 4/1983 | Japan . |
| 1585063 | 2/1981 | United Kingdom | 358/168 |

Primary Examiner—Tommy P. Chin
Attorney, Agent, or Firm—Lewis H. Eslinger

[57] ABSTRACT

A brightness and contrast adjusting apparatus which adjusts the brightness and contrast of a cathode ray tube of a television receiver, comprises an inserting circuit (2) for inserting first and second reference signals $P_C$ and $P_Y$ into a video signal, a variable amplifier (5) for amplifying this video signal, a gain adjusting circuit for detecting the first reference signal $P_C$ from the output of the variable amplifier (5) and for adjusting the gain of the variable amplifier (5) such that the magnitude of the detected signal becomes equal to a predetermined value, a circuit for supplying the output of the variable amplifier (5) to a cathode ray tube (11), a brightness adjusting circuit for detecting the second reference signal $P_Y$ and for adjusting the brightness of the cathode ray tube (11) in response to the magnitude of the second reference signal $P_Y$ detected, adjusting circuits (21) and (23) for varying the levels of the first and second reference signals $P_C$ and $P_Y$, and a constant multiplier circuit (24) for making the level of the second reference signal $P_Y$ equal to a constant multiple of the level of the first reference signal $P_C$. According to this apparatus, it is possible to adjust the contrast and the brightness independently.

5 Claims, 8 Drawing Figures

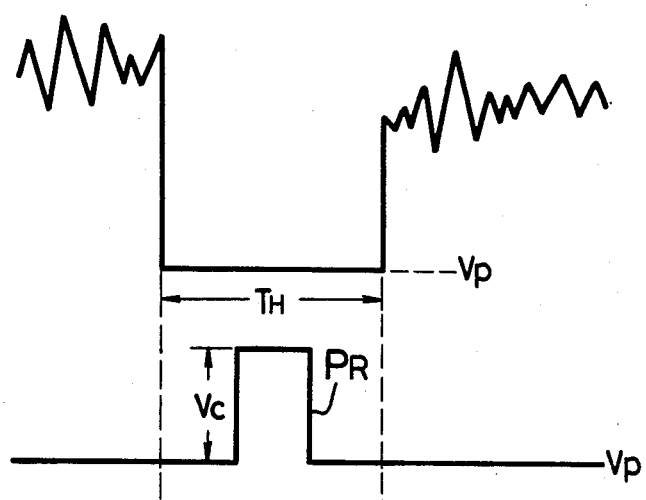
FIG. 4A
FIG. 4B
FIG. 4C
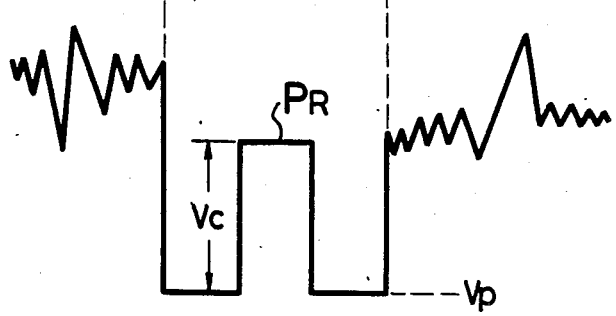
FIG. 4D
FIG. 5
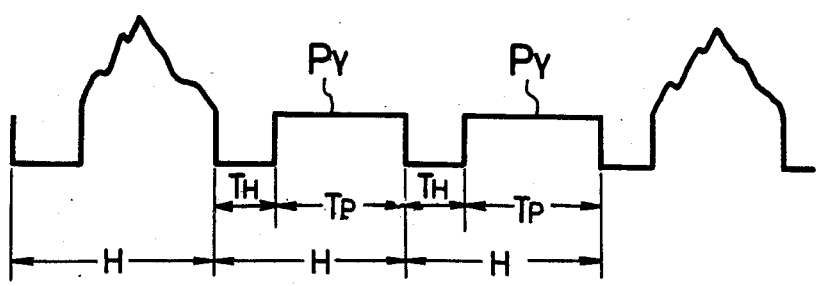

BRIGHTNESS AND CONTRAST ADJUSTING APPARATUS

DESCRIPTION

TECHNICAL FIELD

The present invention relates to a brightness and contrast adjusting apparatus in which a pulse is inserted into a predetermined portion of a video signal and this pulse is used to adjust the brightness and contrast of a cathode ray tube of a television receiver.

BACKGROUND ART

The present applicant has previously proposed in a published document of Japanese Utility Model Application unexamined No. 59-127372 (Japanese Utility Model Application No. 58-22048) a brightness and contrast adjusting apparatus in which a pulse is inserted into a predetermined portion of a video signal and this pulse is used to adjust the brightness and contrast of a picture displayed on a cathode ray tube of a television receiver.

In this apparatus, a predetermined pulse is inserted into a horizontal blanking period of, for example, a video signal, this pulse is detected by a detecting circuit which is provided at the final stage section, this detected pulse is compared with a reference value and on the basis of the compared result, a gain of a gain control amplifier is adjusted. The contrast and the like of the cathode ray tube are adjusted by controlling the height of the pulse inserted.

According to this apparatus, without the influence of temperature drift of the circuit, etc., it is possible to carry out the adjustment with significantly high precision.

When this apparatus is used, it is possible to carry out the adjustment of, for example, the contrast and brightness.

FIG. 2 shows a brightness and contrast adjusting apparatus to which Japanese Utility Model Application unexamined No. 59-127372 is applied. Referring to FIG. 2, a video signal applied to a video signal input terminal 1 is supplied to a mixer 2 in which it is mixed with a contrast adjusting pulse from a reference signal input terminal 3 and a brightness adjusting pulse from a reference pulse input terminal 4. The mixed signal is supplied to a gain adjusting circuit 5. The output from the gain adjusting circuit 5 is supplied to a sample and hold circuit 6 in which it is sampled and then held by a sampling signal supplied from a timing signal input terminal 7 having the same timing as that of a pulse supplied to the reference signal input terminal 3. The potential sampled and held is supplied to a comparator 8 in which it is compared with a reference value a from a reference signal input terminal 9. The gain of the gain adjusting circuit 5 is controlled by the compared output therefrom.

Thus, contrast of a picture displayed on a cathode ray tube is adjusted.

On the other hand, the signal from the gain adjusting circuit 5 is supplied to a video output amplifier 10. This video output is supplied to a cathode ray tube 11 and the magnitude of a beam current is detected by the video output amplifier 10. The detected signal is supplied to a sample and hold circuit 12 in which it is sampled and then held by a sampling signal supplied from a timing signal input terminal 13 and having a same timing as that of the pulse which is supplied to the reference signal input terminal 4. The potential sampled and held is compared in a comparator 14 with a reference value b from a reference signal input terminal 15. The beam current of the cathode ray tube 11 is controlled by this compared output. While as the beam current detecting circuit of the video output amplifier 10, various circuits may be considered, it is possible to use a circuit which is disclosed in U.S. Pat. No. 4,356,508, "Brightness Adjusting Circuit for a Cathode Ray Tube" that the present applicant had proposed.

When the brightness is adjusted by controlling the beam current of this cathode ray tube 11, it may be possible to adjust a grid potential and a cathode potential, too. Moreover, it may be also possible that in response to the detected result of the beam current, the pedestal level of the video signal is controlled to become a predetermined level.

In consequence, the brightness of the picture image displayed on the cathode ray tube 11 can be adjusted.

In this apparatus, however, if the contrast is adjusted by the gain adjusting circuit 5, it is natural that the magnitude of the brightness adjusting pulse in its output signal should be varied. As a result, when the contrast is adjusted, the brightness is also varied so that a troublesome operation such as to re-adjust the brightness after the contrast was adjusted or the like must be carried out.

DISCLOSURE OF THE INVENTION

In view of such aspects, the present invention is to make it possible that the contrast and brightness are adjusted independently.

This invention relates to a brightness and contrast adjusting apparatus, which is characterized in that the apparatus comprises an inserting circuit for inserting first and second reference signals into a video signal, a variable amplifier for amplifying this video signal, a gain adjusting circuit for detecting the first reference signal from the output of the variable amplifier and for adjusting the gain of the variable amplifier such that the magnitude of the detecting signal becomes equal to a predetermined value, a circuit for supplying the output of the variable amplifier to a cathode ray tube, a brightness adjusting circuit for detecting the second reference signal and for adjusting the brightness of the cathode ray tube in response to the magnitude of the second reference signal detected, an adjusting circuit for varying the levels of the first and second reference signals, and a multiplier circuit for making the level of the second reference signal equal to a constant multiple of the level of the first reference signal. According to this apparatus, it is possible to adjust the contrast and brightness independently.

BEST MODE FOR CARRYING OUT THE INVENTION

Figure 1:
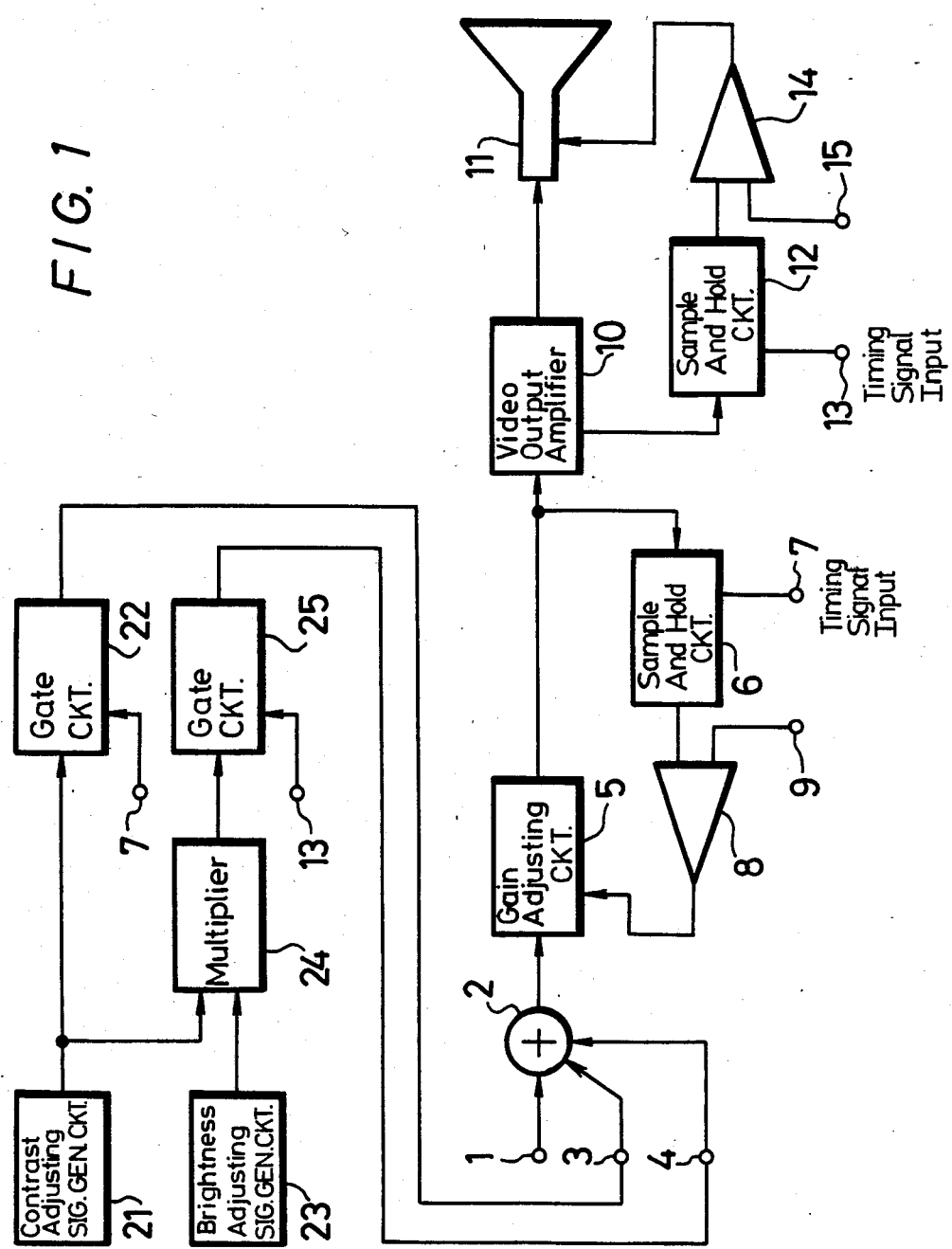
FIG. 1 is a construction diagram showing an embodiment of a brightness and contrast adjusting apparatus according to the present invention.

An embodiment of a brightness and contrast adjusting apparatus according to the present invention will hereinafter be described with reference to FIG. 1. In FIG. 1, like parts corresponding to those of FIG. 2 are marked with the same references and will not be described in detail.

Figures 2, 3:
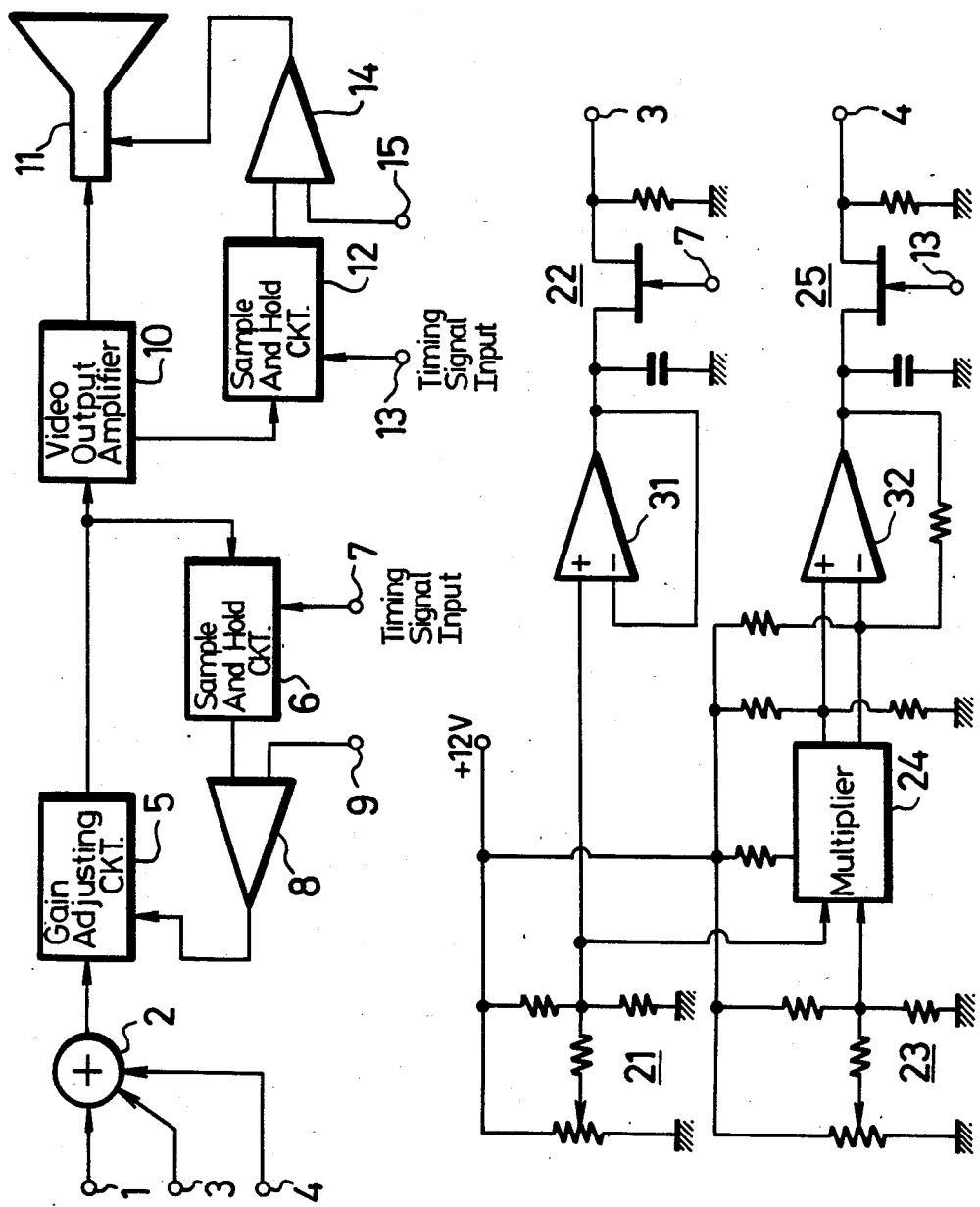
FIG. 2 is a construction diagram showing an example of a prior art brightness and contrast adjusting apparatus.
FIG. 3 is a connection diagram showing a practical circuit of a main part of FIG. 1, and FIGS. 4A–4D and 5 are respectively diagrams useful for explaining the present invention.

In the embodiment shown in addition to FIG. 1, in the brightness and contrast adjusting apparatus of FIG. 2, there is provided a circuit for generating predetermined contrast adjusting pulse and brightness adjusting pulse. In FIG. 1, reference numeral 21 designates a contrast adjusting signal generating circuit. A signal having a predetermined potential from this contrast adjusting signal generating circuit 21 is supplied to a gate circuit 22. To the gate signal input terminal of the gate circuit 22, there is supplied from the timing signal input terminal 7 a gate signal PG having a predetermined timing which exists within a horizontal blanking period $T_H$ of a video signal as shown in FIGS. 4A and 4C. A signal having a predetermined level Vc supplied from the contrast adjusting signal generating circuit 21 is gated by this gate signal PG from the timing signal input terminal 7 and hence a contrast adjusting pulse $P_R$ having a predetermined level Vc as shown in FIG. 4B is generated at the output of this gate circuit 22, or at the reference signal input terminal 3 of the mixer 2. In this case, the mixer 2 produces at its output side such a signal as shown in FIG. 4D in which the contrast adjusting pulse $P_R$ is inserted into the horizontal blanking period $T_H$ of the video signal shown in FIG. 4A. In this case, the contrast adjusting pulse $P_R$ is inserted into the horizontal blanking period $T_H$ of a plurality of consecutive horizontal periods H. If this contrast adjusting pulse $P_R$ is inserted into the blanking period $T_H$ of the plurality of consecutive horizontal periods, when the contrast adjusting pulse $P_R$ is detected at the succeeding stage, the detected signal is averaged so that the contrast adjusting operation becomes more positive and stable.

On the other hand, a signal having a predetermined level $V_Y$ from a brightness adjusting circuit 23 is supplied to a multiplier 24 in which it is multiplied with the signal having the predetermined level Vc from the contrast adjusting signal generating circuit 21. The multiplied signal is supplied to a gate circuit 25, in which it is gated by a gate signal supplied from the timing signal input terminal 13 and which has a predetermined timing that does not overlap the timing signal from the timing signal input terminal 7. Then, a brightness adjusting pulse $P_Y$, which is the multiplied signal, is generated at the output side of this gate circuit 25, i.e., at the reference signal input terminal 4 of the mixer 2. In this case, this brightness adjusting pulse $P_Y$ is inserted into horizontal scanning periods $T_P$ of consecutive two horizontal periods H of the video signal outside the effective picture screen. In other words, at the output side of the mixer 2, there is obtained a video signal in which the brightnes adjusting pulse $P_Y$, which is the multiplied signal, is inserted into the consecutive two horizontal scanning periods $T_P$ of the video signal outside the effective picture screen. Other elements are formed in the same way as those of FIG. 2.

According to this embodiment, value y of the brightness adjusting pulse $P_Y$ supplied to the reference signal input terminal 4 is determined as $$y = k \cdot x \ldots \quad (1)$$

where x is the level of the signal from the contrast adjusting signal generating circuit 21 and k is the level of the signal from the brightness adjusting signal generating circuit 23. It becomes a constant multiple k of the value x of the constrast adjusting pulse $P_C$ supplied to the reference signal input terminal 3.

When the pulses having the values x and y are supplied to the reference signal input terminals 3 and 4, in the apparatus shown in FIG. 2, at first the gain adjusting circuit 5 carries out the control such that the value x becomes equal to the reference value a. Hence, a gain G of the gain adjusting circuit 5 becomes as $$G = \frac{a}{x} \quad (2)$$

Consequently, a value y' of the brightness adjusting pulse derived from the gain adjusting circuit 5 becomes as $$y' = G \cdot y = \frac{a}{x} \cdot y \quad (3)$$

Since the values x and y satisfy the relationship expressed by Eq. (1), substituting them yields $$y' = \frac{a}{x} \cdot k \cdot x = a \cdot k \quad (4)$$

Therefore, even if the value x is varied, the value y' will not be varied any more.

As described above, according to the aforesaid brightness and contrast adjusting apparatus, the contrast and the brightness can be adjusted independently.

FIG. 3 shows an example of a practical circuit of a main part of this embodiment. As FIG. 3 shows, the voltage from a variable resistor which forms the contrast adjusting signal generating circuit 21 is supplied through a voltage follower formed of an operational amplifier 31 to a switching element which forms the gate circuit 22. The voltage from a variable resistor which forms the brightness adjusting signal generating circuit 23 and the voltage from the generating circuit 21 are both supplied to the multiplier 24 which is formed of an IC that is referred to as, for example, MC-1495L. The multiplied output therefrom is supplied through a level shifter formed of an operational amplifier 32 to a switching element which forms the gate circuit 25.

According to the circuit shown in FIG. 3, it is possible to obtain the contrast adjusting pulse and the brightness adjusting pulse which is made as a constant multiple of the former pulse.

In this way, the picture image is adjusted with significant accuracy by using the pulse inserted into the predetermined portion of the video signal. According to the above mentioned brightness and contrast adjusting apparatus, the contrast and the brightness can be adjusted independently so that the adjustment can be carried out very easily.

In this case, it is possible that such adjusting operation as mentioned above may be carried out once at every several minutes. Alternatively, when the power switch of the television receiver is turned on and the television channel is changed over or the like, adjusting operation may be carried out as the user desires to do so.

While in the above embodiment the present invention is applied to the black and white television receiver, it is needless to say that this invention can be applied to a color television receiver and a color projector. When the present invention is applied to the color television receiver, the apparatus shown in FIG. 2 is provided in each of a red color signal system, a green color signal system and a blue color signal system and the contrast adjusting pulse $P_C$ and the brightness adjusting pulse $P_Y$ obtained in connection with FIGS. 1 and 3 are respectively supplied to the reference signal input terminals 3 and 4 of each of the apparatus. Further, when this invention is applied to the color projector, the brightness and contrast adjusting apparatus shown in FIG. 2 is provided for each of three cathode ray tubes of red, green and blue colors, in which the contrast adjusting pulse $P_C$ and the brightness adjusting pulse $P_Y$ obtained in connection with FIGS. 1 and 3 are respectively supplied to the reference signal input terminals 3 and 4 of each of the above cathode ray tubes.

In addition, it is needless to say that the present invention is not limited to the above mentioned embodiment but can take various modifications without departing from the gist of the invention.

I claim:

1. A brightness and contrast adjusting apparatus, which is characterized in that the apparatus comprises an inserting circuit for inserting first and second reference signals to a video signal, a variable amplifier for amplifying said references inserted video signal, a gain adjusting circuit for detecting said first reference signal from an output of said variable amplifier and for adjusting a gain of said variable amplifier such that a magnitude of said detected first reference signal becomes equal to a predetermined value, a circuit for supplying the outlet of said variable amplifier to a cathode ray tube, a brightness adjusting circuit for detecting said second reference signal from said supplying circuit and for adjusting a brightness of said cathode ray tube in response to a magnitude of said detected second reference signal, an adjusting circuit for varying levels of said first and second reference signals, and a constant multiplier circuit for making the level of said second reference signal equal to a constant multiple of the level of said first reference signal.

2. A brightness and contrast adjusting apparatus according to claim 1, said brightness and contrast adjusting apparatus being characterized in that said first reference signal is inserted into a horizontal blanking period of said video signal.

3. A brightness and contrast adjusting apparatus according to claim 1, said brightness and contrast adjusting apparatus being characterized in that said first reference signal is inserted into a horizontal blanking period of a plurality of consecutive horizontal periods of said video signal.

4. A brightness and contrast adjusting apparatus according to claim 1, said brightness and contrast adjusting apparatus being characterized in that said second reference signal is inserted into a horizontal period of said video signal outside an effective picture screen.

5. A brightness and contrast adjusting apparatus according to claim 1, said brightness and contrast adjusting apparatus being characterized in that said second reference signal is inserted over a plurality of horizontal periods of the video signal outside an effective picture screen.

* * * * *